Dec. 15, 1959     L. I. OPPER     2,916,927
VARIABLE SPEED BELT DRIVE

Filed Feb. 28, 1958     2 Sheets-Sheet 2

INVENTOR.
LINCOLN I. OPPER
BY
Reuben Wolk
ATTORNEY

United States Patent Office 2,916,927
Patented Dec. 15, 1959

2,916,927

VARIABLE SPEED BELT DRIVE

Lincoln I. Opper, Dayton, Ohio, assignor to The Dayton Rubber Company, Dayton, Ohio, a corporation of Ohio Application February 28, 1958, Serial No. 718,223

1 Claim. (Cl. 74—230.17)

This invention relates to a variable speed transmission and more particularly to a hydraulically controlled variable speed V-belt drive.

A primary object of the invention is to provide improvements in belt drive control in variable speed transmissions whereby such transmissions may not only be economically manufactured but will be more efficient and satisfactory in use, adaptable to a wide variety of applications and be unlikely to get out of repair.

Variable speed drives generally employ sheaves which are split and comprise a fixed section and a section which is axially adjustable to vary the effective sheave diameter. When speed variation is required, the problem is to provide a proportionate adjustment of the driving and the driven sheaves in such a manner that the power transmitted by the drive belt therebetween is maintained at the proper level. There is also the problem of maintaining the sheaves in a stabilized condition and effecting adequate side pressure on the drive belt at the sheaves under the variable speed conditions.

In the prior art various spring controlled and mechanical linkages have been proposed to interrelate the driving and the driven sheaves in variable speed belt drives in efforts to solve the problems above indicated. Their application has shown basic inadequacies due to the undesirable consequences of the variable loading of springs and the variable flexibility of the mechanical linkages employed. Attempts have also been made to relate spring and hydraulic control units respectively to the driving and driven sheaves in a single system in efforts to overcome the problems inherent in variable speed belt drives with little success.

The present invention offers the solution to the above indicated problems. In its preferred embodiment it directly and positively relates the driving and driven sheaves in a variable speed belt drive in a closed or captive hydraulic system. The nature of the control is such that the sheaves are stabilized at all times irrespective of the driving speed. Further, the system permits variable side pressures on the drive belt, independent of the sheave shifting force to allow for a constant horsepower type of operation, if so desired.

Another object of the invention is to provide improvements in variable speed belt drives whereby the driving and driven sheaves are maintained in a constantly and directly balanced and stabilized condition.

A further object of the invention is to provide a variable speed belt drive employing axially adjustable sheaves directly related in a closed hydraulic system.

An additional object of the invention is to provide a variable speed V-belt drive employing split axially adjustable sheaves wherein the sheaves are directly and simultaneously adjusted during operation in inverse proportionate fashion for speed variation with no lag or loss of efficiency in the process.

Another object of the invention is to provide an improved system for variable speed control of V-belt drives that permits variable side pressures on the drive belt, independent of the sheave adjusting forces to allow for a constant horsepower type of operation, if so desired.

A further object of the invention is to provide a variable speed belt drive system possessing the advantageous structural features, the inherent meritorious characteristics and the mode of operation herein described.

With the above objects in view, as will more fully appear in the specification, the invention intended to be protected by Letters Patent consists of the features of construction, the parts and combinations thereof, and the mode of operation as herein described or illustrated in the accompanying drawings, or their equivalents. The drawings schematically show one, but obviously not necessarily the only form of the invention.

The invention can be best described with reference to the drawings, in which.

Figure 1:
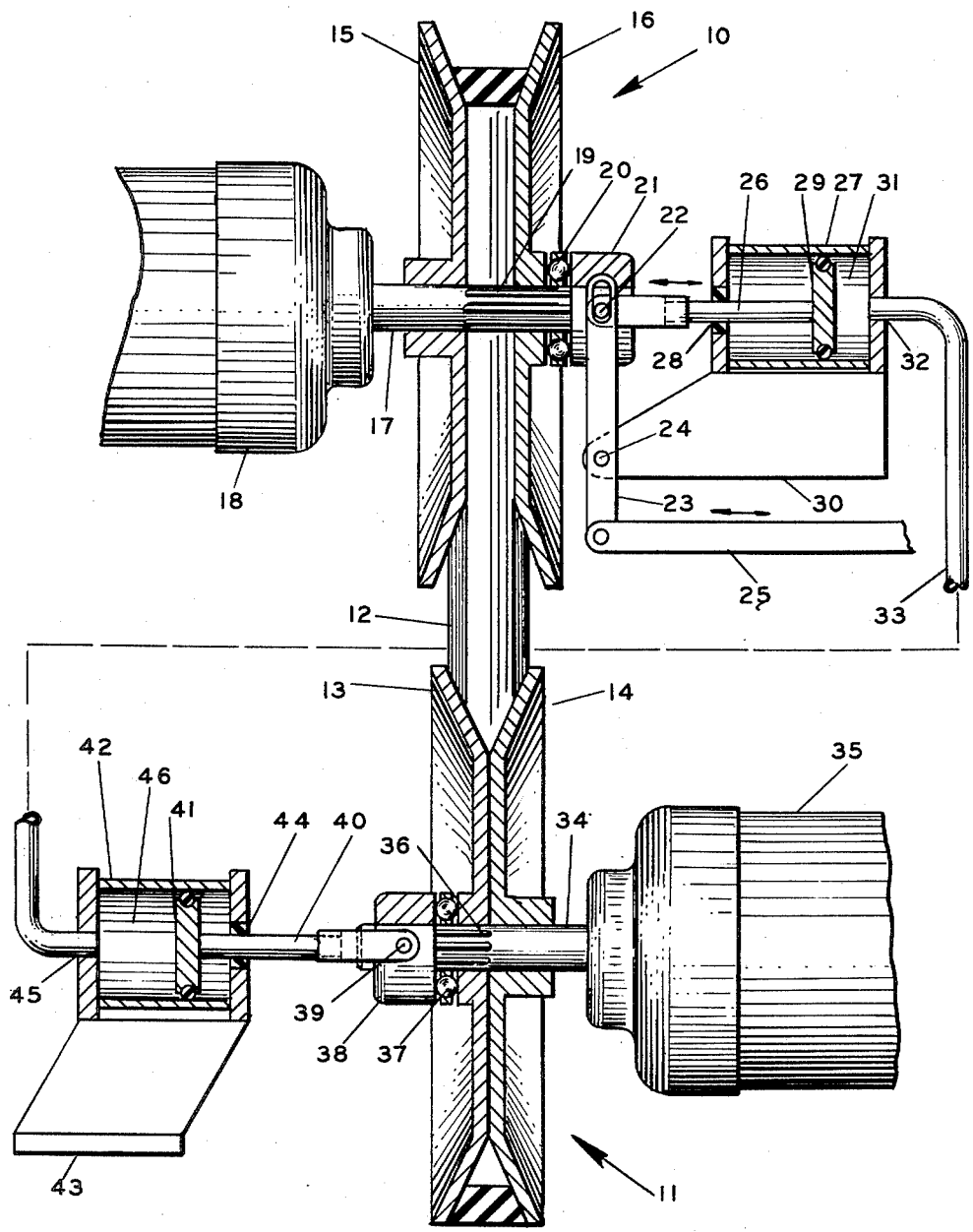
Figure 1 is an elevational view of the novel mechanism, with some portions thereof in section.
Figure 2:
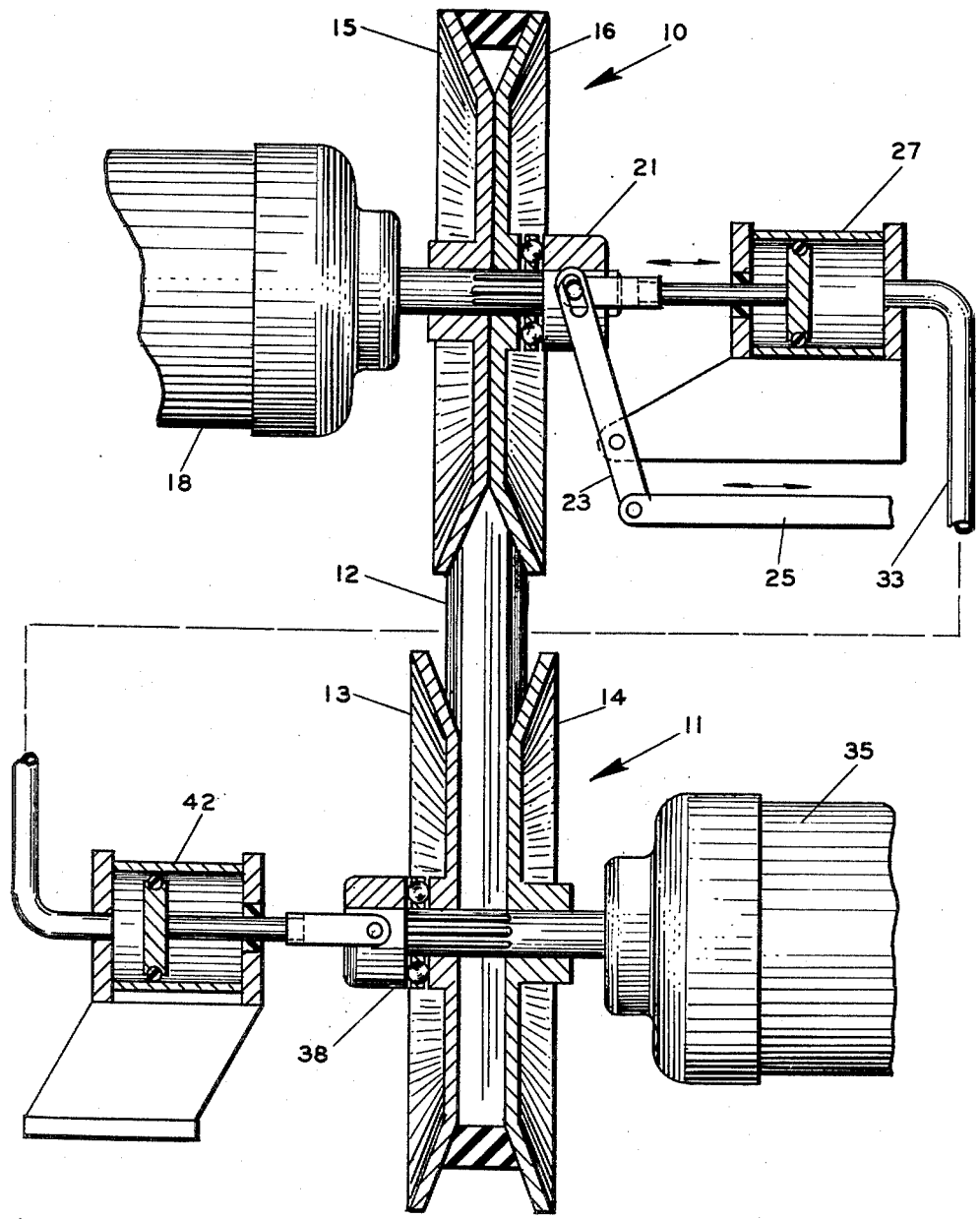
Figure 2 is a view similar to Figure 1 with the mechanism in a different operating position.

Figures 1 and 2 illustrate a hydraulically controlled V-belt drive employing a driving sheave 10 and a driven sheave 11 connected by a continuous V-belt 12. The sheave 10 comprises a pair of sections 15 and 16 connected for rotation by means of a shaft 17 extending from suitable drive means 18.

The sheave section 15 is secured to shaft 17 by conventional means such as brazing, set screws, or the like, while the sheave section 16 is mounted on the shaft and is axially movable thereon to permit reciprocating motion. This sheave section will also rotate with the shaft because of interengagement of its hub portion with splines 19 on the portion of the shaft upon which this sheave slides. Mounted on the shaft 17 adjacent to the section 16 is a thrust bearing 20 of conventional construction which is capable of axial movement on the shaft. A collar 21 is also mounted on the shaft 17 and is adjacent to the bearing, and is also axially movable on the shaft. The inner face of the collar is provided with bearing material to resist the wear imposed by rotation of the shaft. Extending from the outer surface of the collar is a pin 22, to which is attached one end of an arm 23 which pivots about pivot 24. The arm 23 is connected to a driving linkage 25 which is actuated by a conventional control mechanism which may be either mechanical or automatic. Also mounted upon the pin 22 is a piston rod 26 which extends into a cylinder 27, sealed by a seal 28 at the point where the rod passes into the cylinder. The piston rod terminates in piston 29. The cylinder is fixedly mounted on a bracket 30 which is fastened to suitable structure. The cylinder forms a working chamber 31 which is completely sealed off by the piston 29 at one end and the wall of the piston at the other, except for a small aperture 32 which leads to a hydraulic line 33. The chamber 31 will be filled with hydraulic fluid such as oil, which is capable of transmitting the force of the piston.

The sheave 11 consists of sections 13 and 14, and as can be seen in the drawings, sheaves 10 and 11 are in alignment so that the belt 12 may travel between the sheaves in a straight line. The hubs of the sheave sections 13 and 14 are mounted on a shaft 34 connected to a driven member 35. This shaft also has a series of splines 36 similar to those on the shaft 17, extending for the distance upon which the section 13 will travel. Sheave section 13 is thus free for axial movement along the shaft in similar fashion to the sheave section 16 of the sheave 10, and is capable of rotation with the shaft due to interengagement of the splines 36 and the interior mating surface of the hub of this section. The sheave section 14 is attached to the shaft 34 so that it has no sliding action but also rotates with the shaft. The thrust bearing 37 is mounted on the shaft adjacent the sheave 13 and is identical to the bearing 20. This bearing is also capable of axial movement along the shaft. A collar 38, similar to collar 21, is mounted on the shaft adjacent the bearing 37 and is also capable of axial movement along the shaft while sufficiently free to avoid rotation. A pin 39 extends from the outside of the collar and mounts a piston rod 40 which terminates in piston 41 mounted within cylinder 42. The cylinder is fixedly mounted to a bracket 43 which may be fastened to suitable structure. The cylinder 42 defines a chamber 46 which is also filled with hydraulic fluid identical to that in the other cylinder. This cylinder has a seal 44 which closes the entrance through which the piston rod passes, and is sealed at the other end except for a small aperture 45 connected to the hydraulic line 33. While the hydraulic line 33 is illustrated and referred to as being a closed system, it may, of course, be connected to an auxiliary pump, an accumulator, or other mechanism desired to increase the pressure when desired. The line will also include the necessary bleed and other valve devices in order to permit maintenance of the proper pressure.

Operation of the device

The belt drive shown in Figures 1 and 2 is intended for transmitting power from the driving means 18 to the driven member 35 in accordance with conventional design. The power is transmitted by means of the shaft 17, sheave 10, belt 12, sheave 11, and shaft 34. In order to provide the proper drive, the sheaves 10 and 11 are preferably in alignment at all times; that is, the centers of the sheaves are in the same plane. In Figure 1 the sheave 10 is shown at its maximum thickness, that is, its minimum effective diameter. By effective diameter is meant the diameter of that portion of the sheave upon which the working or side faces of the belt are in contact. Since the sections of the sheave 10 are separated as far as possible, the belt rides in the innermost portion of the sheave, giving the minimum effective diameter. The sheave 11, on the other hand, is shown in Figure 1 to be at its minimum thickness or maximum effective diameter. Thus, the ratio of speed between the driving and the driven shafts will be equal to the ratio of the effective diameters of the sheaves. When it is desired to change this ratio, the sections of sheave 10 will be moved together while at the same time the sections of sheave 11 will be separated, thus increasing the effective diameter of sheave 10 and decreasing the effective diameter of sheave 11 until they have reached the positions shown in Figure 2. In this drawing the sheave 10 has a maximum effective diameter, while the sheave 11 has a minimum effective diameter, and thus the ratio of shaft speeds has changed in an amount which depends upon these changes in effective diameter. With the present device it is possible, of course, to achieve any position in between those shown in the figures. To accomplish the change in position, linkage 25 is actuated to the right from the position shown in Figure 1 to that of Figure 2. This mechanism may be a simple manual control from a central control point, or may be accomplished automatically through either electronic, electrical, hydraulic, or mechanical systems. Movement of the linkage 25 to the right causes the arm 23 to swing about pivot 24 and slide the collar 21 to the left, thereby applying lateral pressure to the bearing 20. The collar is free to slide on the shaft 17 but does not rotate therewith, and pressure is applied against the balls of the bearing 20 which then transmits the lateral movement against the hub of sheave section 16. Section 16, of course, is in the process of rotating but is also capable of axial movement along the shaft and will stop at any position desired in accordance with the movement of the linkage 25. As this sheave section moves closer to the fixed sheave section 15, the belt is forced up and rides at a different point in the sheave, thus achieving the new desired position. Simultaneously with the movement of the sheave section, bearing and collar, the piston rod 26 will also be moved to the left because of its connection to the pin 22. This movement reduces the pressure of the hydraulic fluid within the chamber 31 of the cylinder 27, and the reduced pressure is transmitted throught he hydraulic line 33 into the chamber 46 of the cylinder 42 allowing piston 41 and piston rod 40 to move to the left. The rod 40 is coupled to the collar 38 by means of pin 39 and slides the collar to the left as shown in Figure 1 along the shaft 34. This frees the positive pressure tending to hold the sections 13 and 14 together in the position shown in Figure 1, and the action of the belt in riding over an increased diameter of sheave 10 will, therefore, tend to move the belt inwardly of sheave 11, thus forcing the sheave section 13 and the bearing 37 to move to the left along with the collar.

After the belt and mechanism have reached the position shown in Figure 2 and it is desired to reverse the process, actuation of linkage 25 to the left will then reverse the process just described. It is, of course, understood that the specific operation just described is only one of many ways by which the principal invention may be carried out. For example, a positive rather than a negative type of pressure cylinder may be provided by a different relationship of the hydraulic lines to the cylinders, or of the cylinders to the adjustable sheave sections. Regardless of which system is used, the hydraulic transmission permits a simple, positive and immediate movement of the driving sheave and an equally prompt movement of the driven sheave. By means of this system, the relative side forces or pressures between belt and sheave are independent of the shifting force and will thus provide constant horsepower operation at all times. This permits maximum performance at all times because the belt pressures vary with the load requirements. A device manufactured according to this invention will thus permit immediate changes of effective diameters of both driving and driven sheaves during operation with assurance that the changes will be proportional in both sheaves.

It should be particularly noted that although the mechanism described above provides for an equal axial movement of the two sheaves, such equal movement is not necessary to the invention. By means of suitable linkages or other design changes, a proportional variation may be provided. For example, the adjustable sheave section of the driven sheave may be moved twice as far as the adjustable driving sheave section if such a relationship is desired.

The invention has been described in specific structural features, but it is understood that variations of the structure shown may be made without violating the spirit of the invention.

I claim:

A variable speed belt drive including a driving sheave comprising a fixed and an axially movable section mounted on a shaft, a thrust bearing mounted on said shaft adjacent said movable section, a collar mounted on said shaft adjacent said bearing, an actuating mechanism attached to said collar to provide axial movement of said collar, bearing and movable section, a piston rod attached at one end to said collar and at the other end to a piston, a cylinder containing said piston and a portion of said rod, a hydraulic line interconnecting said cylinder with a second cylinder for transmitting power, a piston and rod in said second cylinder, said rod attached to a second collar mounted for axial movement on a second shaft, a thrust bearing mounted on said second shaft adjacent said collar, a driven sheave comprising a fixed and an axially movable section mounted on said second shaft with said movable section adjacent said bearing, axial movement of the movable section of said driving sheave causing an equal and opposite axial movement of the movable section of said driven sheave.

References Cited in the file of this patent

UNITED STATES PATENTS

| | | |
|---|---|---|
| 1,035,860 | Conradson | Aug. 20, 1912 |
| 1,718,108 | Boughton | June 18, 1929 |
| 2,198,940 | Heyer et al. | Apr. 30, 1940 |
| 2,346,868 | Perry | Apr. 18, 1944 |
| 2,779,203 | Eubanks | Jan. 29, 1957 |